(12) United States Patent
Monberg et al.

(10) Patent No.: US 11,762,927 B2
(45) Date of Patent: Sep. 19, 2023

(54) PERSONALIZED CONTENT SYSTEM

(71) Applicant: Zeta Global Corp., New York, NY (US)

(72) Inventors: Christian Monberg, San Francisco, CA (US); Barney Govan, Walnut Creek, CA (US)

(73) Assignee: Zeta Global Corp., New York, NY (US)

( * ) Notice: Subject to any disclaimer, the term of this patent is extended or adjusted under 35 U.S.C. 154(b) by 118 days.

(21) Appl. No.: 16/460,398

(22) Filed: Jul. 2, 2019

(65) Prior Publication Data

US 2020/0125613 A1 Apr. 23, 2020

Related U.S. Application Data

(60) Provisional application No. 62/749,405, filed on Oct. 23, 2018.

(51) Int. Cl.
*G06F 16/9535* (2019.01)
*G06F 16/9532* (2019.01)
*H04L 67/53* (2022.01)

(52) U.S. Cl.
CPC ...... *G06F 16/9535* (2019.01); *G06F 16/9532* (2019.01); *H04L 67/53* (2022.05)

(58) Field of Classification Search
CPC ... G06F 16/9535; G06F 16/9532; H04L 67/20
USPC ........................................................ 707/734
See application file for complete search history.

(56) References Cited

U.S. PATENT DOCUMENTS

| | | | | |
|---|---|---|---|---|
| 6,633,860 B1 * | 10/2003 | Afek | ...................... | G06Q 40/04 705/37 |
| 8,331,365 B2 * | 12/2012 | Rey | ...................... | H04W 28/06 370/390 |
| 8,489,622 B2 * | 7/2013 | Joshi | ................... | G06F 16/2477 707/754 |
| 8,548,973 B1 * | 10/2013 | Kritt | ................... | G06F 16/9535 707/706 |
| 8,577,913 B1 * | 11/2013 | Hansson | ............. | G06F 16/9535 707/767 |
| 8,751,466 B1 * | 6/2014 | Tsay | ....................... | G06F 16/951 707/700 |
| 9,043,894 B1 * | 5/2015 | Dennison | ............. | H04L 63/1408 726/11 |
| 10,268,728 B2 * | 4/2019 | Keohane | ............. | G06F 16/9535 |
| 10,572,477 B2 * | 2/2020 | Browne | ............. | G06F 16/24542 |
| 10,846,745 B1 * | 11/2020 | Meissner | ............ | G06Q 30/0267 |
| 10,902,066 B2 * | 1/2021 | Puzicha | .................. | G06F 16/93 |

(Continued)

*Primary Examiner* — Mark E Hershley
(74) *Attorney, Agent, or Firm* — Schwegman Lundberg & Woessner, P.A.

(57) ABSTRACT

Processes and apparatuses for content personalization are provided, providing for rule configuration. Content personalization systems interpret user behavior and attributes along with the content users are interacting with, to build optimized predictive models of what content the user may want to see next. Those predictive models can be utilized to personalize content in one or more environments, including email, mobile and applications. Rules include filters applied to the predictive model output and/or the overall system output. Filters can be prioritized and iteratively applied or removed to adjust system output to satisfy desired result set criteria.

18 Claims, 9 Drawing Sheets

| PRIORITY | FILTER CRITERIA | TARGET FILTER(S) |
|---|---|---|
| MANDATORY | TIME SINCE CONTENT CREATION <48 HOURS | MODEL OUTPUT |
| 1 | TIME SINCE CONTENT CREATION <36 HOURS | MODEL OUTPUT |
| 2 | PERSONALIZATION SCORE > X | MODEL OUTPUT |
| 3 | TIME SINCE CONTENT CREATION <24 HOURS | MODEL OUTPUT |
| 4 | PERSONALIZATION SCORE > Y | MODEL OUTPUT |

(56) References Cited

U.S. PATENT DOCUMENTS

| | | | |
|---|---|---|---|
| 11,080,336 B2* | 8/2021 | Van Dusen | G06Q 50/01 |
| 11,379,538 B1* | 7/2022 | McClusky | G06F 16/3346 |
| 2008/0052203 A1* | 2/2008 | Beyer | G06Q 10/087 |
| | | | 705/28 |
| 2008/0092199 A1* | 4/2008 | McCarthy | H04N 21/25 |
| | | | 725/35 |
| 2009/0164394 A1* | 6/2009 | Multerer | G06Q 10/10 |
| | | | 706/12 |
| 2009/0322756 A1* | 12/2009 | Robertson | G06F 16/34 |
| | | | 707/E17.014 |
| 2010/0070448 A1* | 3/2010 | Omoigui | H01L 27/1463 |
| | | | 706/55 |
| 2011/0225293 A1* | 9/2011 | Rathod | G06Q 10/10 |
| | | | 709/224 |
| 2012/0210066 A1* | 8/2012 | Joshi | G06F 12/0897 |
| | | | 711/E12.017 |
| 2012/0210068 A1* | 8/2012 | Joshi | G06F 9/45558 |
| | | | 711/E12.017 |
| 2013/0124648 A1* | 5/2013 | Kallayil | G06Q 10/107 |
| | | | 709/206 |
| 2013/0226925 A1* | 8/2013 | Carbonell | G06Q 30/02 |
| | | | 707/E17.069 |
| 2014/0188911 A1* | 7/2014 | Skeen | G06F 16/9535 |
| | | | 707/754 |
| 2014/0194188 A1* | 7/2014 | Kosta | G07F 17/3279 |
| | | | 463/25 |
| 2015/0006258 A1* | 1/2015 | Salama | G06Q 10/00 |
| | | | 705/7.35 |
| 2015/0120767 A1* | 4/2015 | Skeen | H04N 21/00 |
| | | | 707/754 |
| 2015/0178282 A1* | 6/2015 | Gorur | G06F 16/9535 |
| | | | 707/748 |
| 2015/0254330 A1* | 9/2015 | Chan | G06F 16/273 |
| | | | 707/613 |
| 2016/0117470 A1* | 4/2016 | Welsh | G16H 50/70 |
| | | | 705/3 |
| 2016/0253710 A1* | 9/2016 | Publicover | H04N 21/2187 |
| | | | 705/14.66 |
| 2016/0360336 A1* | 12/2016 | Gross | H04W 4/025 |
| 2017/0053008 A1* | 2/2017 | Frenkel | G06F 16/26 |
| 2017/0116552 A1* | 4/2017 | Deodhar | G06Q 10/0639 |
| 2017/0124157 A1* | 5/2017 | Keohane | G06F 16/24575 |
| 2017/0357251 A1* | 12/2017 | Bowman | G05B 19/41885 |
| 2018/0027006 A1* | 1/2018 | Zimmermann | G06F 21/6218 |
| | | | 726/11 |
| 2018/0096027 A1* | 4/2018 | Romero | G06F 16/9535 |
| 2018/0144369 A1* | 5/2018 | Pouliot | G08G 1/161 |
| 2018/0218084 A1* | 8/2018 | Song | G06F 16/9535 |
| 2018/0240052 A1* | 8/2018 | Goyal | G06Q 10/0637 |
| 2018/0315180 A1* | 11/2018 | Townsend | G06T 7/0008 |
| 2019/0034976 A1* | 1/2019 | Hamedi | G06Q 30/0243 |
| 2019/0050451 A1* | 2/2019 | Davidoff | G06F 16/2425 |
| 2019/0102155 A1* | 4/2019 | Garvey | G06F 8/61 |
| 2022/0092621 A1* | 3/2022 | Abdallah | G06F 3/0482 |

* cited by examiner

| PRIORITY | FILTER CRITERIA | TARGET FILTER(S) |
|---|---|---|
| MANDATORY | TIME SINCE CONTENT CREATION <48 HOURS | MODEL OUTPUT |
| 1 | TIME SINCE CONTENT CREATION <36 HOURS | MODEL OUTPUT |
| 2 | PERSONALIZATION SCORE > X | MODEL OUTPUT |
| 3 | TIME SINCE CONTENT CREATION <24 HOURS | MODEL OUTPUT |
| 4 | PERSONALIZATION SCORE > Y | MODEL OUTPUT |

Fig. 9

PERSONALIZED CONTENT SYSTEM

CLAIM OF PRIORITY

This patent application claims the benefit of priority, under 35 U.S.C. Section 119(e), to Monberg et al, U.S. Provisional Patent Application Ser. No. 62/749,405, entitled "Personalized Content System", filed on Oct. 23, 2018, which is hereby incorporated by reference herein in its entirety.

TECHNICAL FIELD

The present disclosure relates in general to data processing systems and methods, and in particular to systems presenting personalized content.

BACKGROUND

Users of internet services can be presented with display pages, such as web pages or email messages rendered by an email client, which are transmitted via the Internet from a content originator to a recipient. One form of internet service that has become particularly popular is email, enabling a sender to generate and transmit messages to a recipient's server for downloading and review by the recipient at their convenience. Another form of internet service that has become particularly popular is an e-commerce web site, via which individuals can learn about and procure products and services. Yet another form of internet service that has become particularly popular is a content publication web site, via which users can consume informational content of interest to them (such as articles, photographs and video). These types of internet services have become primary methods by which individuals shop for goods and services and consume informational content.

In some cases, internet-based services may use information about the recipient to personalize the content or appearance of display pages that are presented. Several mechanisms have been developed to accomplish such personalization, including mechanisms to recommend content or products that are believed to be of interest to a viewer based on the viewer's past activities or behavior. For example, an e-commerce site may personalize its home page to highlight items for sale at which the viewing customer has recently reviewed. A content publisher may allow a viewer to configure a preferred category of content, which is then displayed to the viewer immediately on their "home page" view of a content site.

Existing content personalization models present participants and system designers with several technical challenges. For example, personalization algorithms may generate result sets that do not necessarily align with target objectives.

SUMMARY

Some example embodiments provide a personalization platform that better aligns output with target objectives in a wide variety of use cases and includes a simple personalization mechanism that is accessible to non-technical business users.

In some examples, the present disclosure provides systems and methods for configuring and implementing rules in a content personalization system. In accordance with one aspect, a personalization platform is provided, which interprets user behavior and attributes, along with the content users are interacting with, to implement optimized predictive models of what content a user may want to see next. Those predictive models can be utilized to personalize content in one or more environments, including email, mobile and applications.

Processes and apparatuses for content personalization are provided, providing for rule configuration. Content personalization systems interpret user behavior and attributes along with the content users are interacting with to build optimized predictive models of what content the user may want to see next. Those predictive models can be utilized to personalize content in one or more environments, including email, mobile and applications. Rules include filters applied to the predictive model output and/or the overall system output. Filters can be prioritized and iteratively applied or removed to adjust system output to satisfy desired result set criteria.

In some examples, a content personalization system comprises at least one processor for executing machine-readable instructions; and a memory storing instructions configured to cause the at least one processor to perform operations comprising, at least: configuring a set of filters with one or more filter criteria; activating the configured filters; receiving a request for a personalization result from one of a plurality of third-party systems; generating the personalization result; transmitting the personalization result to a rule component of the personalization system and evaluating a compliance of the personalization result with result set criteria; based on a determination that the personalization result satisfies the result set criteria, returning the personalization result in an output as a final personalization result.

In some examples, the operations further comprise determining whether any non-mandatory filter criteria remain active in response to a determination that the personalization result does not satisfy the result set criteria.

In some examples, the operations further comprise, based on a determination that non-mandatory filter criteria remain active, reconfiguring the set of filters to deactivate a lowest priority active filter criterion.

In some examples, the operations further comprise, based on a determination that non-mandatory filter criteria are not active, returning the personalization result in an output as a final personalization result.

In some examples, the operations further comprise relaxing the result set criteria based on an undersized personalization result.

In some examples, the operations further comprise removing a filter from the set of filters based on an undersized personalization result.

Various other objects, features, aspects, and advantages of the present inventive subject matter and embodiments will become more apparent from the following detailed description of preferred embodiments, along with the accompanying drawings in which like numerals represent like components.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 9 is an exemplary set of ranked filter criteria.

DETAILED DESCRIPTION

Figure 1:
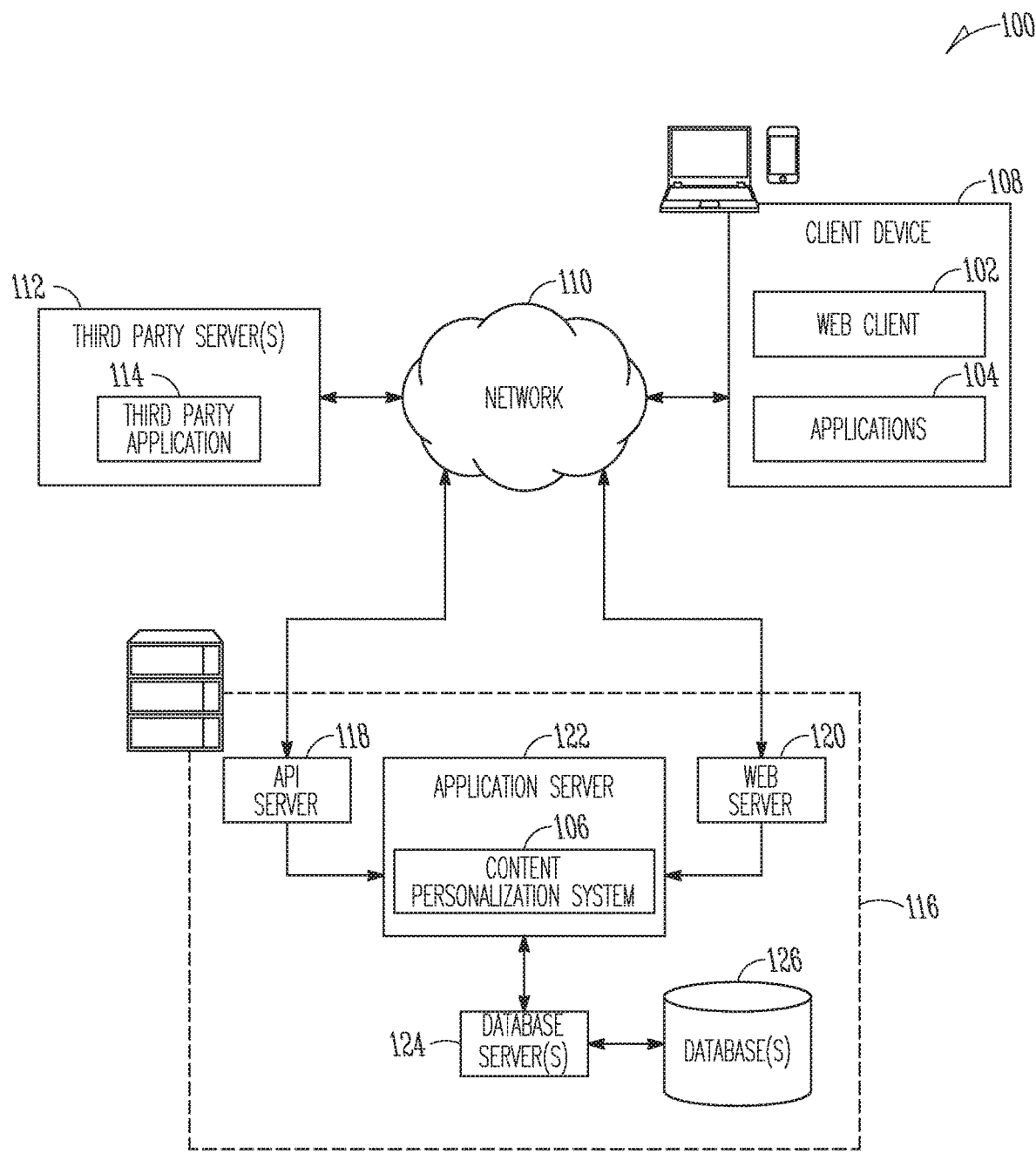
FIG. 1 is a block diagram illustrating a networked environment for a content personalization system, according to an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail. The present disclosure provides technical solutions to address technical problems in content personalization systems. Systems, methods, and architectures for the optimization of content personalization systems are disclosed herein.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019, Zeta Interactive Corp., All Rights Reserved.

"CARRIER SIGNAL" in this context in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of several well-known transfer protocols.

"CLIENT DEVICE" in this context refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT" in this context refers to a device, a physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, later, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across several machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium, or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of an application 104, are hosted and execute on the client device 108. The networked system 116 includes an application server 122, which in turn hosts a content personalization system 106 for configuring and implementing rules in a content personalization methods according to example embodiments. The content personalization system 106 provides a number of functions and services to the application 104 that accesses the networked system 116. The application 104 also provides a number of interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the content personalization system 106, which includes components or applications. The application server 122 is, in turn, shown to be coupled to a database server 124 that facilitates access to information storage repositories (e.g., a database 126). In an example embodiment, the database 126 includes storage devices that store information accessed and generated by the content personalization system 106.

Additionally, a third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third-party.

Turning now specifically to the applications hosted by the client device 108, the web client 102 may access the various systems (e.g., content personalization system 106) via the web interface supported by the web server 120. Similarly, the application 104 (e.g., an "app") accesses the various services and functions provided by the content personalization system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The content personalization system 106 could also be implemented as a standalone software program, which does not necessarily have networking capabilities.

Figure 2:
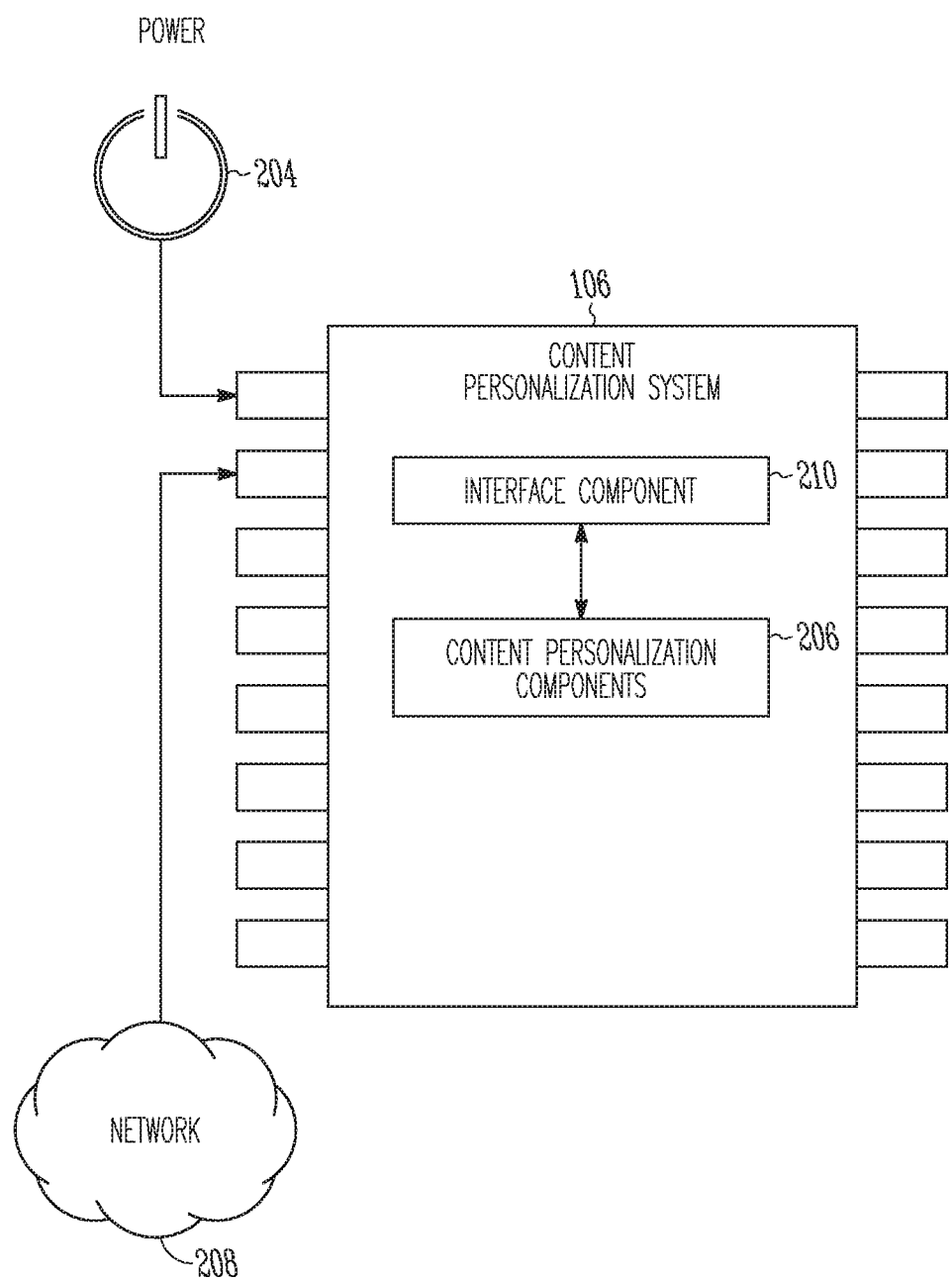
FIG. 2 is a block diagram showing architectural details of the networked environment, according to some example embodiments.

FIG. 2 is a block diagram showing architectural details of a content personalization system 106, according to some example embodiments. Specifically, the content personalization system 106 is shown to include an interface component 210 by which the content personalization system 106 communicates (e.g., over a network 208) with other systems within the SaaS network architecture 100.

The interface component 210 is collectively coupled to one or more content personalization components 206 that operate to provide specific aspects of content personalization, in accordance with the methods described further below with reference to the accompanying drawings.

Figure 3:
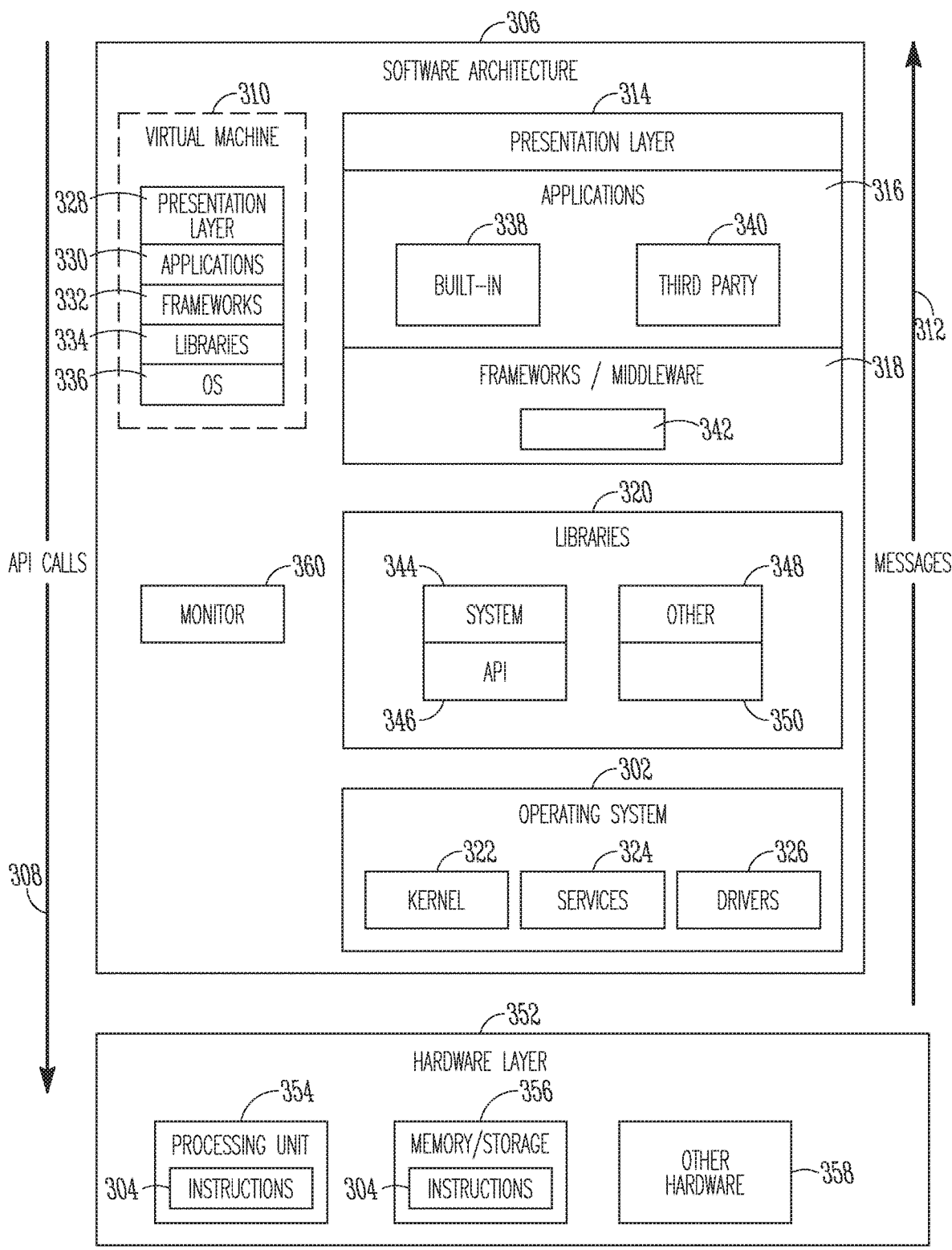
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) API calls 308 through the software stack and receive messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
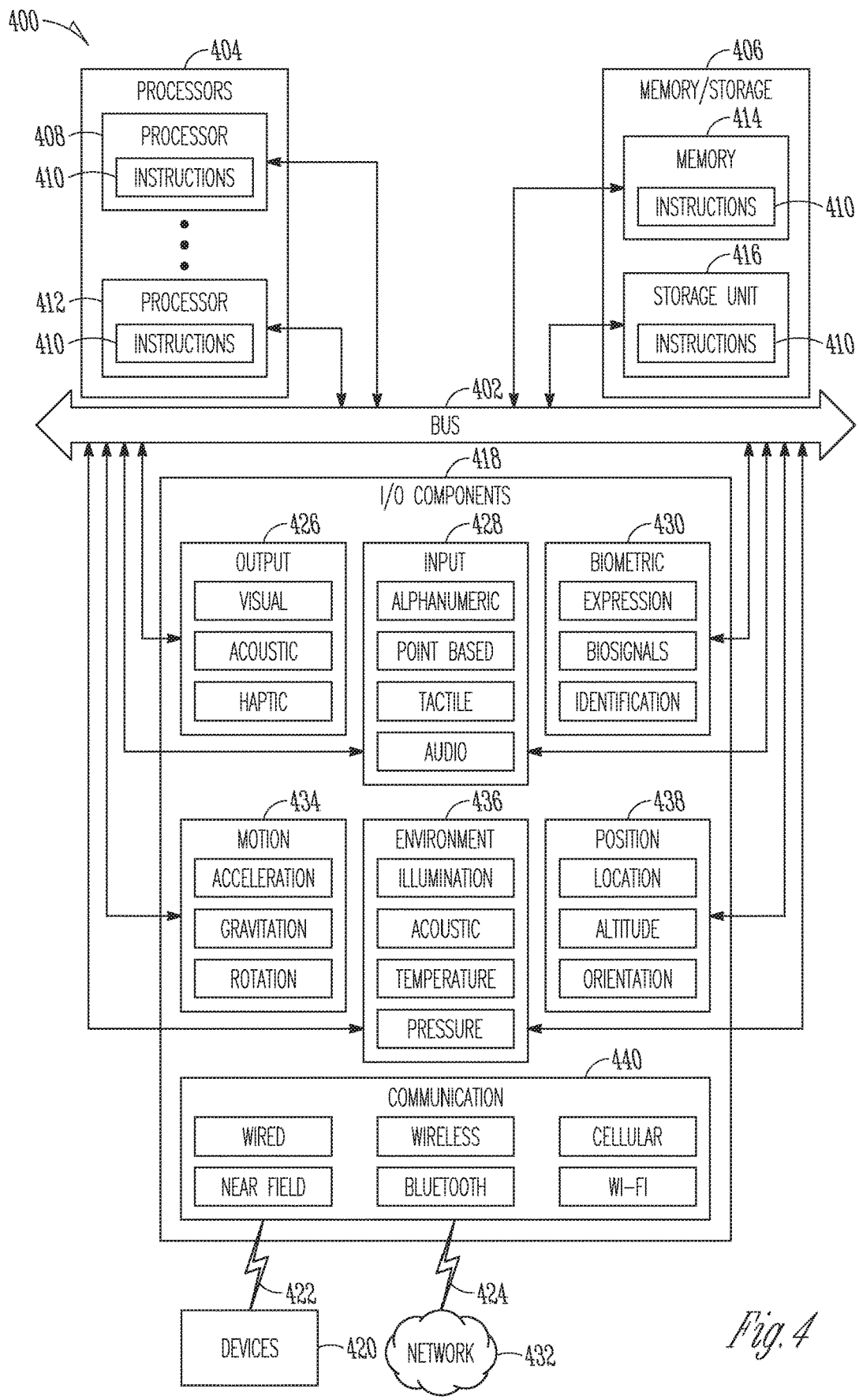
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the specific described and illustrated functions in the manner described.

In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

In this example, the systems and methods are described in the general context of computer program instructions executed by one or more computing devices that can take the form of a traditional server/desktop/laptop; mobile device such as a smartphone or tablet; etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java, .NET Framework (VB.NET, ASP.NET, AJAX.NET, etc.); and other e-commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Figure 5:
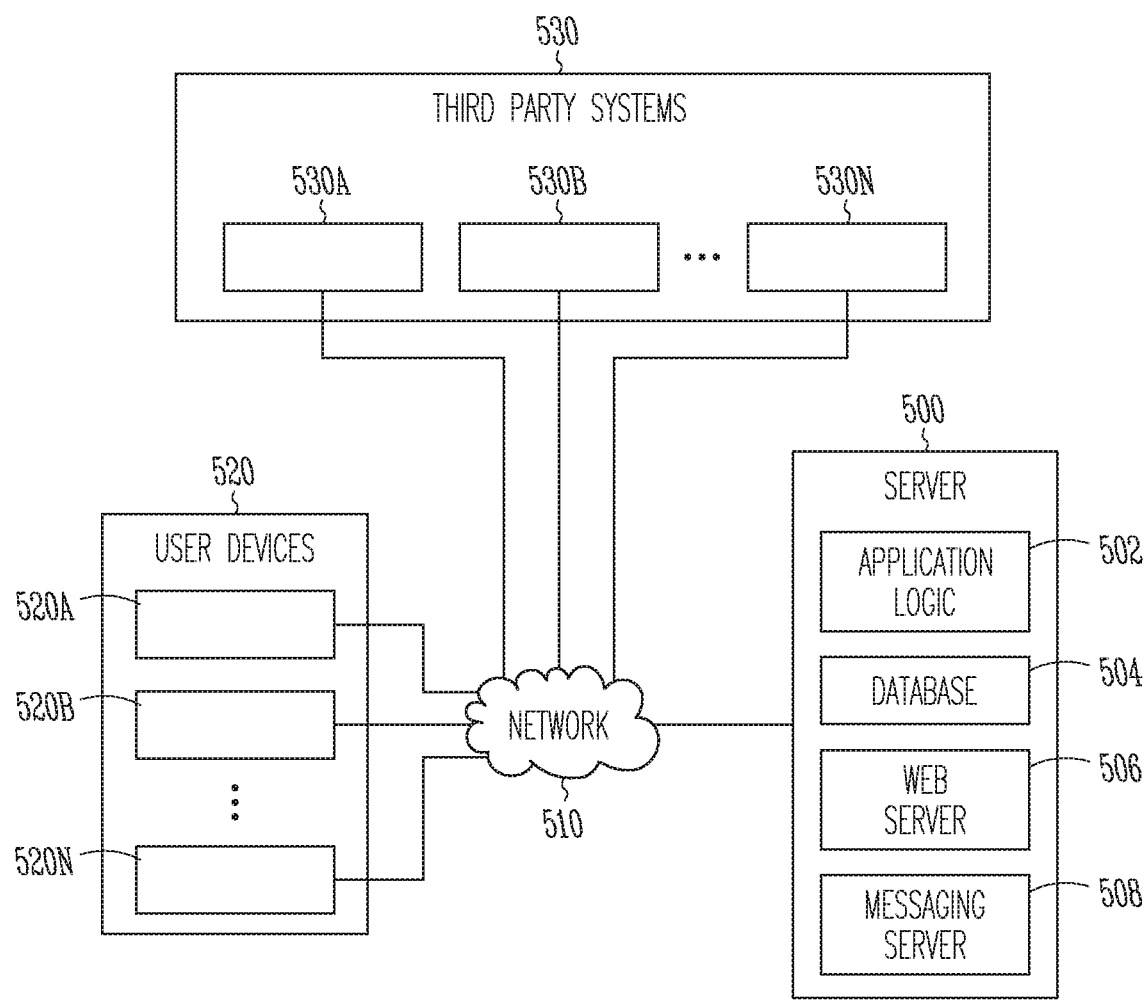
FIG. 5 is a schematic block diagram illustrating an exemplary computing environment for a content personalization system.

FIG. 5 is a schematic block diagram of an embodiment of a content personalization system. Server 500 communicates, inter alia, via computer network 510, which may include the Internet, with multiple user devices 520 and multiple third-party systems 530. User devices 520 preferably include a number of individual user devices such as a personal computer, tablet computer, smart phone, smart watch, smart appliances, and other such computing devices, which may be used by individuals to access services such as Internet web sites, email, instant messaging, social networking, locally-installed applications and other network-connected services and applications.

Server 500 implements application logic 502, and operates to store information within, and retrieve information from, database 504. The term "database" is used herein broadly to refer to a store of data, whether structured or not, including without limitation relational databases and document databases. Web server 506 hosts one or more Internet web sites and/or APIs enabling outside user interaction with, amongst other things, application logic 502 and database 504. Messaging server 508 enables email and/or instant messaging, such as SMS or MMS communications, between server 500 and user devices 520.

While depicted in the schematic block diagram of FIG. 5 as a block element with specific sub-elements, server 500 may be implemented in a variety of ways, including via distributed hardware resources and using any of multiple different software stacks. Server 500 may include multiple web servers, application servers, database servers, email servers, storage servers, SMS or other instant messaging servers, and the like. That said, the implementation of server 500 will include at some level one or more physical servers, at least one of the physical servers having one or more microprocessors and digital memory for, inter alia, storing instructions which, when executed by the processor, cause the servers to perform methods and operations described herein.

Third-party systems 530 include network-connected services and applications, such as web sites, social networking platforms, content publication platforms, ad networks, email servers; and APIs or other interaction interfaces for these and other systems. In some embodiments, one or more of third-party systems 530 will be customers of server 500, for which server 500 provides real-time personalization functionality on service basis.

Figure 6:
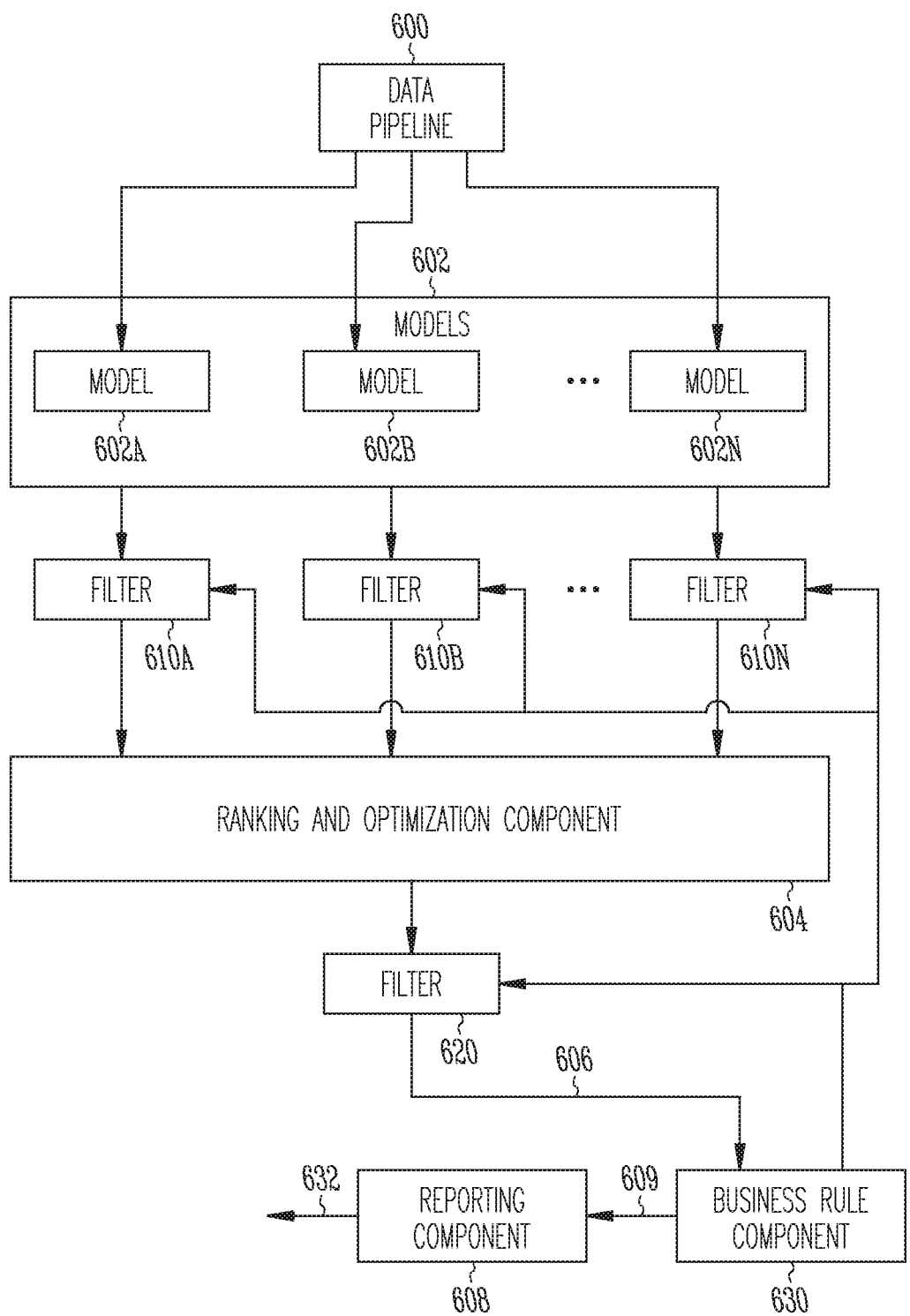
FIG. 6 is a schematic block diagram of an example rule.

The communication environment of FIG. 5, with server 500 executing application logic 502, can be utilized to implement real-time personalization services. FIG. 6 illustrates an exemplary embodiment of such a real-time personalization system. At a high level, data pipeline 600 feeds multiple analytic models 602. The outputs of analytic models 602 are fed to ranking and optimization component 604. Ranking and optimization component 604 generates output 606, which is conveyed to rule component 630. Based upon satisfaction of rule criteria; rule component 630 passes output 609 to reporting component 608, Reporting component 608 can make output 632 available to other internal or external systems, such as one or more of third-party systems 530.

Embodiments of the real-time personalization system may implement rules through, e.g., the configuration and application of filters at various stages within the system structure. In the embodiment of FIG. 6, filters are applied at two different stages. Filters 60 are applied at the Machine Learning level; specifically, to the outputs of each analytic model 602. Filters 620 are applied at the display level; specifically, to the output aggregated by ranking and optimization component 604.

Each of filters 610 and 620 may implement one or more filter criteria. The filter criteria are determined in accordance with rules defined by a user, such as via a graphical user interface rendered by web server 506 and accessed from one or more of user devices 520. Rule component 630 dynamically activates and deactivates filter criteria implemented by filters 610 and 620, in accordance with rules, which may be user configurable. Preferably, during rule configuration, filter criteria are assigned a priority relative to one another. Filter criteria priority can then be utilized in activating or deactivating filter criteria in accordance with configured rules.

Figure 7:
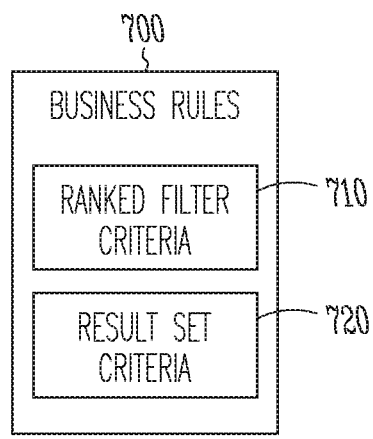
FIG. 7 is a schematic block diagram of a content personalization system, according to an example embodiment.

FIG. 7 is a schematic illustration of a rule, which may be implemented by rule component 6. Rule 700 includes ranked filter criteria 7, and result set criteria 720. Ranked filter criteria 710 contains filters that may be applied to one or more of analytic module filters 610 or display set filter 620, Preferably, each criterion within filter criteria 710 is ranked in priority relative to others of filter criteria 710. In some embodiments, one or more of filter criteria 710 may also be designated as mandatory. Result set criteria 720 define one or more target attributes for the personalization result 609.

Figure 8:
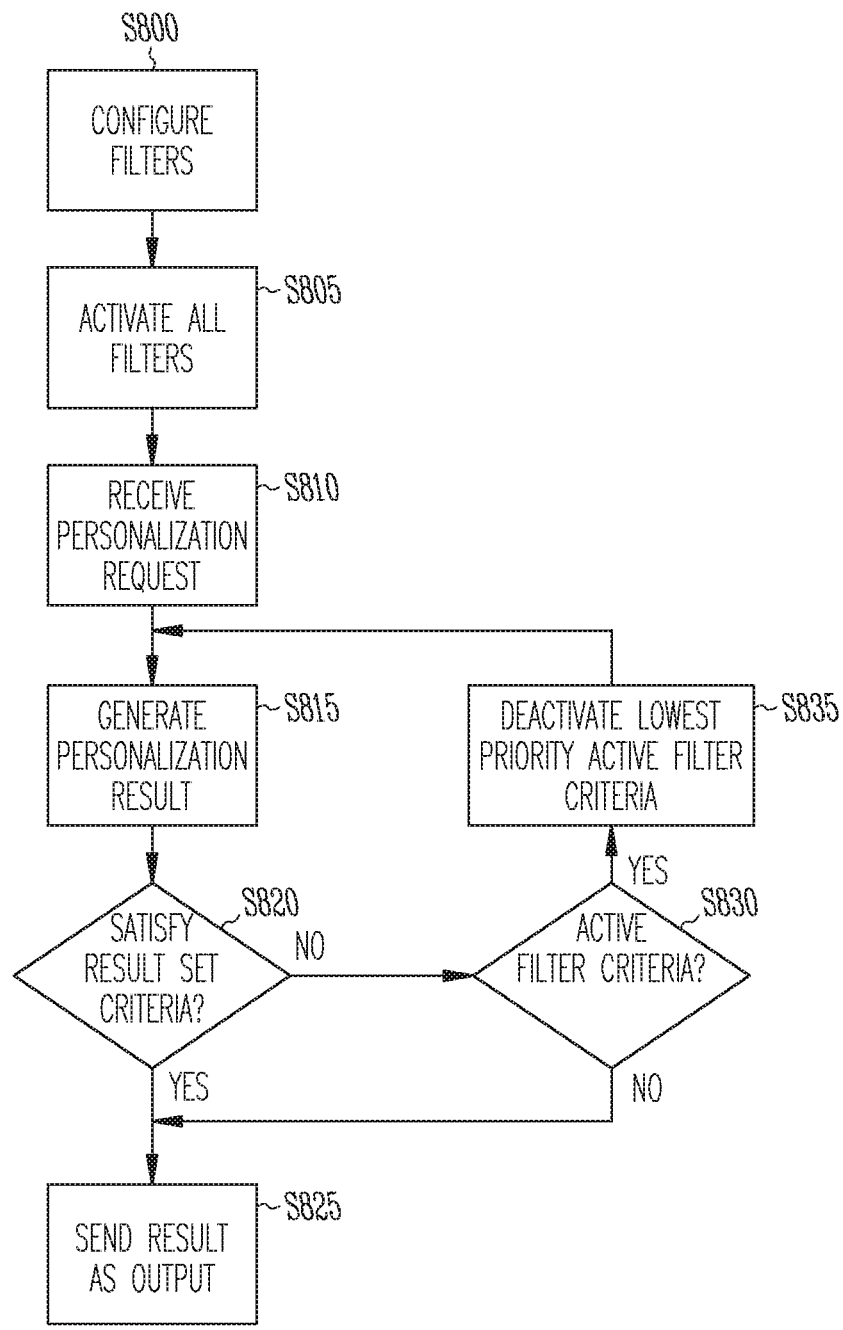
FIG. 8 is an exemplary flow chart depicting some operations in a process of implementing rules in a content personalization system.

FIG. 8 illustrates a process that can be implemented by the personalization system of FIG. 6. In step S800, rule component 630 configures filters 610 and 620 with one or more filter criteria 710. In step S805, all configured filters are activated. In step S810, server 500 receives a call for personalization result from one of third-party systems 530. In step S815, the personalization system of FIG. 6 is implemented to generate a personalization result 609. Personalization result 609 is passed to rule component 630 and evaluated for compliance with result set criteria 720 (step S820). If the personalization result satisfies result set criteria 720, the result is returned as a final personalization result (step S825). If the personalization result does not satisfy each of result set criteria 720, rule component 630 determines whether any non-mandatory filter criteria remain active (step S830). If so, rule component 630 reconfigures filters 610 and/or 620 to deactivate the lowest priority active filter criteria (step S835). If not, the most recent result set is returned as a final personalization result (step S825). Through the operation of FIG. 8, the personalization system of FIG. 6 operates to implement as many of ranked filter criteria 710 as possible, while still achieving result set criteria 320.

As an illustrative example, the content personalization system of FIG. 6 may be utilized by a web-based news service to publish late-breaking news, personalized to be of interest to web site visitors. FIG. 9 shows an example of ranked filter criteria 710 in such an embodiment, with criteria based on time since content creation, and personalization score for a particular content item (i.e., the degree to which a particular content item is believed to be of interest to a particular viewer). In such an embodiment, result set criteria 720 may require (for example) that at least 10 news stories be presented to a user on the site home page. During implementation of the process of FIG. 8, initially, all of the filter criteria in FIG. 9 are implemented, such that display filter output 606 includes only content items created in the last twenty-four hours (consistent with the site's business objective of presenting late-breaking news) and having a personalization score exceeding a threshold Y (consistent with a business objective to provide personalized news of interest to the reader). In step S810, a request is received by server 500 (i.e., the third-party new service is implementing a request to generate a content set for a user). In step S815, a personalization result set is generated. In step S820, the result set of step S815 is evaluated for compliance with result set criteria 720, i.e., did the personalization mechanism return at least 10 news stories? If so, reporting component 608 returns at least the top 10 results (ranked in personalization score order) to third-party system.

If the personalization mechanism fails to return 10 content items satisfying filter criteria 710, then a determination is made as to whether non-mandatory filter criteria remain active (step S830). If so, rule component 630 deactivates the lowest priority active filter criteria. In this example, the priority 4 filter criteria ("personalization score>Y") is deactivated, such that the remaining filter criteria require personalization score>X, while still requiring time since content creation<24 hours. Heuristically, the system is loosening the personalization requirement, while maintaining the "breaking news" timeliness requirement, in order to identify a desired number of content items to meet the content provider's business objectives.

The above-described operation continues, iteratively removing filter criteria in an effort to meet the rule result set criteria of presenting at least 10 content items. In the example of FIG. 9, the system next relaxes the timeliness requirement to 36 hours since content creation, rather than 24. If the result set is still too small, the system further relaxes the personalization score requirement. If the result set is still too small, the system further relaxes the timeliness requirement to 48 hours. The final criteria ("time since content creation<48 hours") is designated as mandatory; if the result set remains too small with only this criterion in place, an undersized result set is returned. This could reflect, for example, a business judgment of unwillingness to further compromise on the content provider's mission of providing late-breaking news content.

In some examples, when a request is received, it may contain filters based on layout requirements (for example, three items in a sports section). At that point, the content personalization service may take a number of actions, for example, obtain a user behavior and attributes, or identify a rule (also called a parameter in some examples, from a parameter service) which may guide which model to run, or how to route the request towards certain models that apply to the rule in question. Alternatively, the system may retrieve all content that satisfies the applied filters (for example, all sports videos that have been created within the last two days based on global business rules or filters). If insufficient content is returned from a "resource service", for example, some filters may be peeled off (removed). At that point, all of the aforementioned data may be pushed into the applicable model and, based on the personalized outcome and additional rules (for example, don't show the user items they've previously interacted with (or) viewed), some filters will peel off again until the required number of items (in this example, three items in a sports section) is available per the layout requirements.

Certain embodiments described above implement filter criteria having predetermined relative priority, where all criteria are initially applied and then progressively removed, as necessary. However, it is contemplated and understood that alternative mechanisms for iteratively applying filter criteria could be implemented. For example, a subset of filter criteria could be initially applied, with additional criteria being added if the result set meets a first result set criteria (e.g. the result set exceeds a certain size), and criteria being removed if the result meets a second result set criteria (e.g. the result set falls below a threshold size). In yet other embodiments, the system may evaluate correlation between a filter criterion and its impact on result set size and utilize that correlation in prioritizing filter criteria (for example, including the maximum number of filter criteria possible while still meeting a result set criteria).

In some examples, a non-transitory machine-readable medium includes instructions that, when read by a machine, cause the machine to perform operations comprising at least the non-limiting example operations summarized above, and described more generally herein with reference to the accompanying figures.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computerized method for personalizing content at a content personalization system, the method including operations comprising at least:
    configuring a set of filters that implements one or more filter criteria determined in accordance with rules configured by a user, the set of filters being configured at a machine learning level and at a display level, each of the one or more filter criteria being assigned a priority relative to one another during rule configuration by the user, an assignable priority including a mandatory designation, and the one or more filter criteria including a timeliness requirement comprising a time since content creation criterion;
    activating the set of filters;
    receiving a request for a personalization result from one of a plurality of third-party systems;
    generating the personalization result, the generating including feeding data to a plurality of analytics models and applying the activated set of filters to outputs of the plurality of analytic models;
    evaluating whether the personalization result satisfies result set criteria;
    adjusting the timeliness requirement by increasing the time since content creation criterion if the personalization result, based on an application of the mandatory assignable priority when applying the activated set of filters, does not satisfy the result set criteria;
    re-applying the activated set of filters including the adjusted timeliness requirement to outputs of the plurality of analytic models;
    and
    based on a determinization that the personalization result satisfies the result set criteria, returning the personalization result in an output as a final personalization result.

2. The method of claim 1, wherein the operations further comprise determining whether any non-mandatory filter criteria remain active in response to a determination that the personalization result does not satisfy the result set criteria.

3. The method of claim 2, wherein the operations further comprise, based on a determination that non-mandatory filter criteria remain active:
    reconfiguring the set of filters to deactivate a lowest priority active filter criterion; and
    repeating at least the generating, and the evaluating.

4. The method of claim 2, wherein the operations further comprise, based on a determination that non-mandatory filter criteria are not active, returning the personalization result in an output as the final personalization result.

5. The method of claim 1, wherein the operations further comprise relaxing the result set criteria based on an undersized personalization result.

6. The method of claim 1, wherein the operations further comprise removing a filter from the set of filters based on an undersized personalization result.

7. A content personalization system comprising:
    at least one processor for executing machine-readable instructions; and
    a memory storing instructions configured to cause the at least one processor to perform operations comprising, at least:

configuring a set of filters that implements one or more filter criteria determined in accordance with rules configured by a user, the set of filters being configured at a machine learning level and at a display level, each of the one or more filter criteria being assigned a priority relative to one another during rule configuration by the user, an assignable priority including a mandatory designation, and the one or more filter criteria including a timeliness requirement comprising a time since content creation criterion;

activating the set of filters;

receiving a request for a personalization result from one of a plurality of third-party systems;

generating the personalization result, the generating including feeding data to a plurality of analytics models and applying the activated set of filters to outputs of the plurality of analytic models;

evaluating whether the personalization result satisfies result set criteria;

adjusting the timeliness requirement by increasing the time since content creation criterion if the personalization result, based on an application of the mandatory assignable priority when applying the activated set of filters, does not satisfy the result set criteria;

re-applying the activated set of filters including the adjusted timeliness requirement to outputs of the plurality of analytic models;

and based on a determinization that the personalization result satisfies the result set criteria, returning the personalization result in an output as a final personalization result.

8. The system of claim 7, wherein the operations further comprise determining whether any non-mandatory filter criteria remain active in response to a determination that the personalization result does not satisfy the result set criteria.

9. The system of claim 8, wherein the operations further comprise, based on a determination that non-mandatory filter criteria remain active:
reconfiguring the set of filters to deactivate a lowest priority active filter criterion; and
repeating at least the generating, and the evaluating.

10. The system of claim 8, wherein the operations further comprise, based on a determination that non-mandatory filter criteria are not active, returning the personalization result in an output as the final personalization result.

11. The system of claim 7, wherein the operations further comprise relaxing the result set criteria based on an undersized personalization result.

12. The system of claim 7, wherein the operations further comprise removing a filter from the set of filters based on an undersized personalization result.

13. A non-transitory, machine-readable medium containing instructions which, when read by a machine, cause the machine to perform operations comprising, at least:

configuring a set of filters that implements one or more filter criteria determined in accordance with rules configured by a user, the set of filters being configured at a machine learning level and at a display level, each of the one or more filter criteria being assigned a priority relative to one another during rule configuration by the user, an assignable priority including a mandatory designation, and the one or more filter criteria including a timeliness requirement comprising a time since content creation criterion;

activating the set of filters;

receiving a request for a personalization result from one of a plurality of third-party systems;

generating the personalization result, the generating including feeding data to a plurality of analytics models and applying the activated set of filters to outputs of the plurality of analytic models;

evaluating whether the personalization result satisfies result set criteria;

adjusting the timeliness requirement by increasing the time since content creation criterion if the personalization result, based on an application of the mandatory assignable priority when applying the activated set of filters, does not satisfy the result set criteria;

re-applying the activated set of filters including the adjusted timeliness requirement to outputs of the plurality of analytic models;

and based on a determinization that the personalization result satisfies the result set criteria, returning the personalization result in an output as a final personalization result.

14. The medium of claim 13, wherein the operations further comprise determining whether any non-mandatory filter criteria remain active in response to a determination that the personalization result does not satisfy the result set criteria.

15. The medium of claim 14, wherein the operations further comprise, based on a determination that non-mandatory filter criteria remain active:
reconfiguring the set of filters to deactivate a lowest priority active filter criterion; and
repeating at least the generating, and the evaluating.

16. The medium of claim 14, wherein the operations further comprise, based on a determination that non-mandatory filter criteria are not active, returning the personalization result in an output as the final personalization result.

17. The medium of claim 13, wherein the operations further comprise relaxing the result set criteria based on an undersized personalization result.

18. The medium of claim 13, wherein the operations further comprise removing a filter from the set of filters based on an undersized personalization result.

* * * * *